Dec. 5, 1961 L. C. A. M. BIGNON 3,011,200
WINDSCREEN WIPER ARMS
Filed Feb. 1, 1960 2 Sheets-Sheet 2
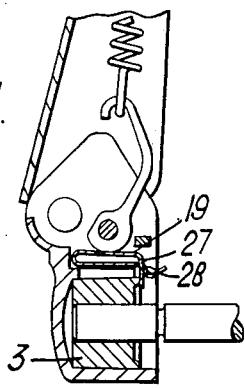
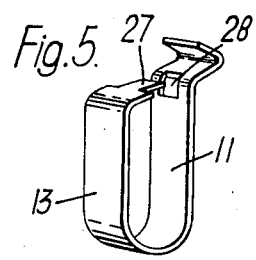
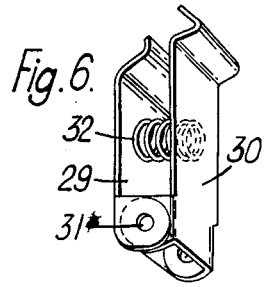
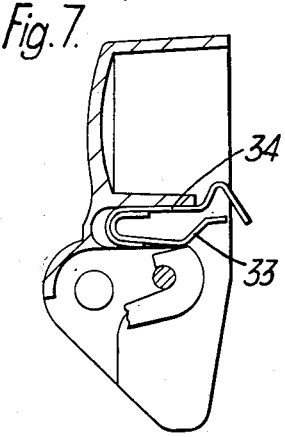
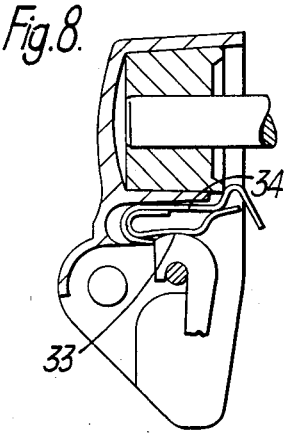
*Inventor*
Lucien Charles Alexis Marie Bignon
By Beau, Brooks, Buckley & Beau
*Attorney*

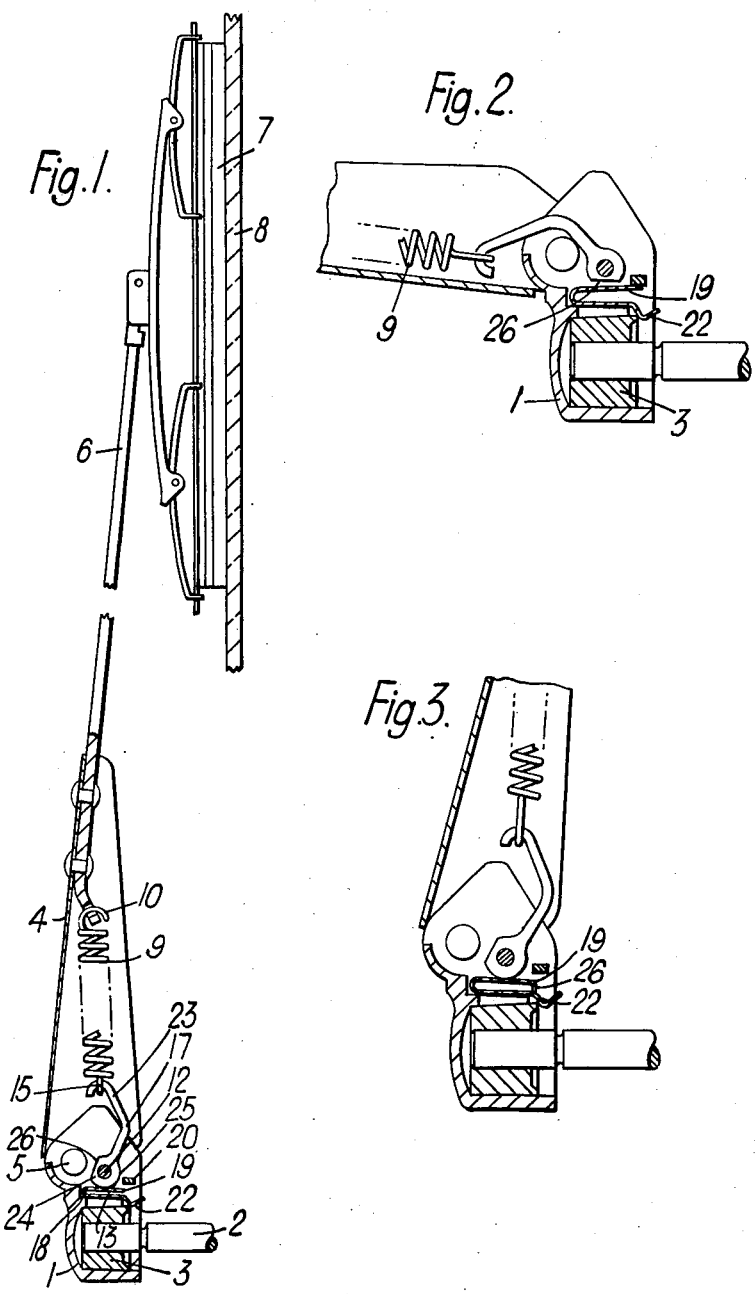

United States Patent Office 3,011,200
Patented Dec. 5, 1961

3,011,200
WINDSCREEN WIPER ARMS
Lucien Charles Alexis Marie Bignon, 26 Rue Guynemer, Issy, Seine, France
Filed Feb. 1, 1960, Ser. No. 5,894
7 Claims. (Cl. 15—250.34)

According to the present invention, a windscreen wiper arm consists of a hub having an axial recess to receive the head of a wiper shaft, and an outer arm pivoted to the hub so as to be movable to and from a windscreen, a spring latch in the hub for engaging the head of the shaft, and a tension spring connected between the hub and the outer arm, the connection of the spring to the hub being by means of a link which is pivoted to the hub, the link pivot being nearer than the outer arm pivot to the hub axis, and the link being cranked so as to clear the outer arm pivot and permit the spring to pass through dead centre from a position in which it urges the outer arm towards the screen to a position in which it urges the outer arm away from the screen, and the pivoted link acting on the latch so that the latch pressure is light when the outer arm is away from the screen, but the pressure is increased, or the latch is locked solid, when the outer arm is near the screen.

The invention will be explained in more detail with reference to the accompanying drawings in which:

FIGURE 1 is a fragmentary section of a wiper arm according to the present invention;

FIGURE 2 is a view showing the maximum movement away from the windscreen of the wiper arm shown in FIGURE 1;

FIGURE 3 is a view similar to FIGURE 1 showing a modification;

FIGURE 4 is a view similar to FIGURE 1 showing another modification;

FIGURE 5 is a perspective view on a larger scale of the spring latch in the wiper shown in FIGURE 4;

FIGURE 6 is a perspective view on a large scale of another form of spring latch; and FIGURES 7 and 8 are views of yet another form of spring latch in the disengaged and engaged position.

In the wiper shown in FIGURES 1 and 2, the wiper arm consists of a hub 1 and an outer arm 6. The hub fits on to a head 3 on a wiper shaft 2. The outer arm 6 carries a wiper 7 for wiping a windscreen 8. The inner part of the outer arm is in the form of a connector 4 which is pivoted to the hub 1 on a pin 5. A tension spring 9 is connected between the hub 1 and the outer arm 6. One end of the spring has a hook 10 to engage the outer arm. The other end of the spring has a hook 15 which engages a link 23 pivoted on a pin 12 in the hub. The spring 9 serves to urge the wiper 7 towards the screen. To permit cleaning of the screen and replacement of the wiper it is possible to swing the outer arm 6 away from the screen against the action of the spring. The link is cranked at 17 so as to clear the outer arm pivot 5. This means that the arm can be moved away from the windscreen into the position shown in FIGURE 2. In this position the arm is practically perpendicular to the windscreen, which greatly facilitates access. Since the pin 12 is nearer than the outer arm pivot 5 to the axis of the hub 1, the action of the spring 9 in the position shown in FIGURE 2 tends to hold the arm in its outer position, that is to say in passing from the position shown in FIGURE 1, to the position shown in FIGURE 2 the spring has passed through the dead centre position.

There is a spring latch to secure the hub 1 to the wiper shaft head 3. This is in the form of a U-shaped leaf spring, having its bight 18 inserted into a recess in the hub. The spring may be retained in the recess by friction or by a pin, not shown, passed through the bight. One limb 19 of the spring engages against the link 23. The other limb has its end formed into a detent 22 which engages beneath the head 3. An axial force on the hub 1 deflects the detent and permits the hub to be removed. It is desirable to permit ease of removal when desired but yet to secure the hub more positively on the wiper shaft at other times.

The inner end of the link 23 is in the form of a boss 24 turning on the pin 12. Part of the periphery of the boss is concentric with the pin as shown at 25 and a camming part is formed as a depression 26.

When the arm is swung away from the windscreen as shown in FIGURE 2 then the depression 26 faces the limb 19. The spring thus applies a weak restraint against removal of the hub. When, however, the arm is swung towards the windscreen, as shown in FIGURE 1, the concentric part 25 of the boss 24 deflects the limb 19 and thus considerably increases the pressure with which the detent 22 engages the head 3.

In FIGURE 1 it is still possible for the spring to flex and allow displacement of the detent 22. FIGURE 3 shows an alternative arrangement in which flexing is positively prevented when the arm is against the windscreen. In this modification the limb 19 has its end turned over as a projection 26 which engages the other limb close to the detent 22.

In the modification in FIGURES 4 and 5 a positive lock is obtained by slightly different means. The end of the limb 19 is formed as a finger 27 which passes through an opening 28 in the other limb and engages beneath the head 3.

FIGURES 6 to 8 show alternatives to the formation of the spring latch as a single U of spring strip. In FIGURE 6 the latch has its two limbs 29 and 30 pivoted together at 31 and urged apart by a compression spring 32 confined between them. In FIGURES 7 and 8 the spring latch consists of two separate pieces of spring strip, each piece constituting a limb and a U-shaped base. The base of the limb 33 fits within the base of the limb 34.

I claim:

1. A windscreen wiper arm comprising a hub having an axial recess to receive the head of a wiper shaft, and an outer arm pivoted to the hub for movement to and from a windscreen, spring latch means securing the hub to the head of the shaft, and a tension spring connected between the hub and the outer arm and providing wiping pressure for a wiper carried by the latter, the connection of the spring to the hub being by means of a link which is pivoted to the hub, the link pivot being nearer than the outer arm pivot to the hub axis and the link being cranked so as to clear the outer arm pivot and permit the spring to pass through dead centre from a position in which it urges the outer arm towards the screen to a position in which it urges the outer arm away from the screen, and means responsive to the link in its last named position to reduce the holding force of the spring latch means to facilitate removal of the hub from the head when the outer arm is lifted from the screen so that the latch pressure is light when the outer arm is away from the screen, but the holding force is increased when the outer arm is near the screen.

2. A wiper arm according to claim 1 in which the responsive means is in the form of a camming part on the link and the spring latch means is a member having opposed resiliently supported limbs, one limb of which carries a detent to engage the head of the shaft, and the other limb of which is engaged by the camming part on the limb.

3. A wiper arm according to claim 2 in which, when the outer arm is near the screen, the camming part presses the two limbs of the latch means into inter-engagement to maintain the hub mounting.

4. A wiper arm according to claim 2 in which the second limb of the latch means also carries a detent, which when the outer arm is near the screen, is pressed by the camming part into engagement with the head of the shaft.

5. A wiper arm according to claim 2 in which the two limbs of the latch means are rigid members pivoted together, with a spring confined between them.

6. A wiper arm according to claim 2 in which the two limbs are separate pieces, each which a U shaped base, one base fitting within the other.

7. A windshield wiper arm comprising a hub having an axial recess to receive the head of a wiper shaft, and an outer arm pivoted to the hub for movement to and from a windscreen, spring latch means frictionally securing the hub to the head of the shaft, and spring means interposed between the hub and the outer arm and in one position exerting wiping pressure through the outer arm upon a wiper carried thereby, said spring means being movable through dead-center by and upon lifting the outer arm from the windscreen to a second position in which said spring means urges the outer arm away from the screen, said spring means in its second position reducing the holding force of the spring latch means to facilitate a removal of the hub from the head when the outer arm is so lifted from the screen.

References Cited in the file of this patent

UNITED STATES PATENTS 2,365,251    Curtiss _____ Dec. 19, 1944

FOREIGN PATENTS 843,371    Germany _____ July 7, 1952